US012523983B2

(12) United States Patent
Lee et al.

(10) Patent No.: US 12,523,983 B2
(45) Date of Patent: Jan. 13, 2026

(54) POINT CLOUD ALIGNMENT

(71) Applicant: Peridot Print LLC, Palo Alto, CA (US)

(72) Inventors: Juheon Lee, Palo Alto, CA (US); Juan Carlos Catana Salazar, Guadalajara (MX); Jun Zeng, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 460 days.

(21) Appl. No.: 18/011,080

(22) PCT Filed: Jun. 19, 2020

(86) PCT No.: PCT/US2020/038729
§ 371 (c)(1),
(2) Date: Dec. 16, 2022

(87) PCT Pub. No.: WO2021/257094
PCT Pub. Date: Dec. 23, 2021

(65) Prior Publication Data
US 2023/0221698 A1 Jul. 13, 2023

(51) Int. Cl.
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/49023* (2013.01)

(58) Field of Classification Search
CPC ...... G05B 19/4099; G05B 2219/49023; B33Y 50/00; G06N 3/045; G06N 3/08;
(Continued)

(56) References Cited

U.S. PATENT DOCUMENTS 9,619,691 B2    4/2017 Pang et al.
2017/0140537 A1*    5/2017 Jia .......................... H04N 13/204
(Continued)

FOREIGN PATENT DOCUMENTS

CN    109919145 A    6/2019
KR    10-2079380 B1    2/2020

OTHER PUBLICATIONS

Chang et al. "3-D Point Cloud Registration Using Convolutional Neural Networks;" Aug. 9, 2019; Applied Sciences, 9, 3273, pp. 5 and 6. (Year: 2019).*

(Continued)

*Primary Examiner* — Chad G Erdman
(74) *Attorney, Agent, or Firm* — Shook, Hardy & Bacon L.L.P.

(57) ABSTRACT

Examples of methods for point cloud alignment are described herein. In some examples, a method includes orienting a model point cloud or a scanned point cloud based on a set of initial orientations. In some examples, the method includes determining, using a first portion of a machine learning model, first features of the model point cloud and second features of the scanned point cloud. In some examples, the method includes determining, using a second portion of the machine learning model, correspondence scores between the first features and the second features based on the set of initial orientations. In some examples, the method includes globally aligning the model point cloud and the scanned point cloud based on the correspondence scores.

10 Claims, 5 Drawing Sheets

(58) Field of Classification Search
CPC . G06T 2207/10028; G06T 2207/20072; G06T 2207/20076; G06T 2207/20081; G06T 2207/20084; G06T 7/0006; G06T 7/344; B29C 64/386

See application file for complete search history.

(56) References Cited

U.S. PATENT DOCUMENTS

| | | |
|---|---|---|
| 2019/0156472 A1 | 5/2019 | Link et al. |
| 2019/0269485 A1* | 9/2019 | Elbaz .................... A61B 5/1079 |
| 2020/0005485 A1 | 1/2020 | Xu et al. |
| 2020/0043186 A1 | 2/2020 | Selviah et al. |
| 2021/0081673 A1* | 3/2021 | Lai .......................... G06V 20/41 |
| 2021/0166411 A1* | 6/2021 | Akdemir .................... G06T 7/33 |
| 2021/0321872 A1* | 10/2021 | Saphier ................ A61B 5/7475 |
| 2021/0353203 A1* | 11/2021 | Burman ................ G16H 50/30 |

OTHER PUBLICATIONS

Hattab, A., et al. "3D Rigid Registration of Cad Point-Clouds", 2018 International Conference on Computing Sciences and Engineering (ICCSE), Mar. 2018, pp. 1-7.

Yang, J., et al., "Modeling Point Clouds with Self-Attention and Gumbel Subset Sampling", CVF, 2019, pp. 3323-3332.

\* cited by examiner

POINT CLOUD ALIGNMENT

BACKGROUND

Three-dimensional (3D) solid parts may be produced from a digital model using manufacturing. Manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

DETAILED DESCRIPTION

Figure 1:
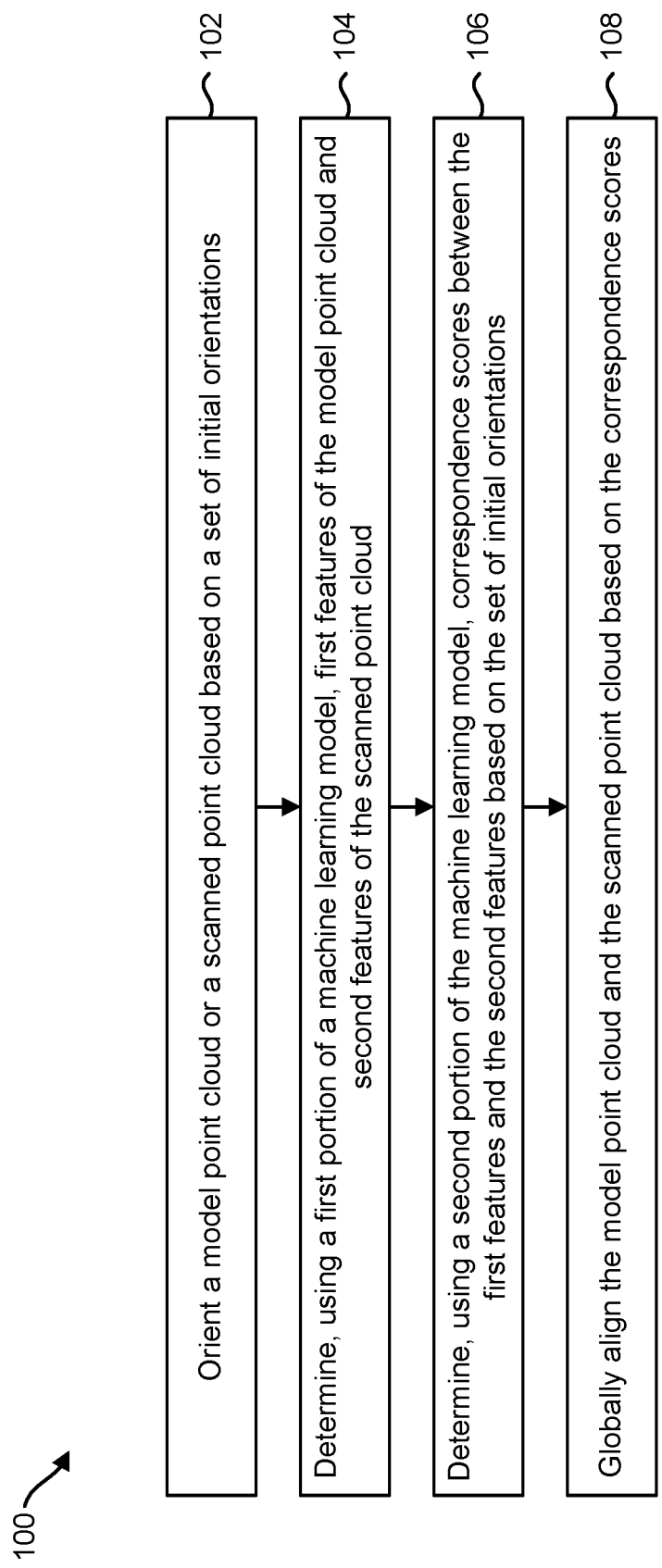
FIG. 1 is a flow diagram illustrating an example of a method for point cloud alignment.

Three-dimensional (3D) printing is an example of manufacturing. For example, thermal energy may be projected over material in a build area, where a phase change and solidification in the material may occur at certain voxels. A voxel is a representation of a location in a 3D space (e.g., a component of a 3D space). For instance, a voxel may represent a volume that is a subset of the 3D space. In some examples, voxels may be arranged on a 3D grid. For instance, a voxel may be cuboid or rectangular prismatic in shape. In some examples, voxels in the 3D space may be uniformly sized or non-uniformly sized. Examples of a voxel size dimension may include 25.4 millimeters (mm)/150≈170 microns for 150 dots per inch (dpi), 490 microns for 50 dpi, 2 mm, 4 mm, etc. The term "voxel level" and variations thereof may refer to a resolution, scale, or density corresponding to voxel size.

In some examples, the techniques described herein may be utilized for various examples of manufacturing. For instance, some examples may be utilized for plastics, polymers, semi-crystalline materials, metals, etc. Some manufacturing techniques may be powder-based and driven by powder fusion. Some examples of the approaches described herein may be applied to area-based powder bed fusion-based additive manufacturing, such as Stereolithography (SLA), Multi-Jet Fusion (MJF), Metal Jet Fusion, metal binding printing, Selective Laser Melting (SLM), Selective Laser Sintering (SLS), liquid resin-based printing, etc. Some examples of the approaches described herein may be applied to manufacturing where agents carried by droplets are utilized for voxel-level thermal modulation.

In some examples of manufacturing, thermal energy may be utilized to fuse material (e.g., particles, powder, etc.) to form an object. For example, agents (e.g., fusing agent, detailing agent, etc.) may be selectively deposited to control voxel-level energy deposition, which may trigger a phase change and/or solidification for selected voxels. The manufactured object geometry may be driven by the fusion process, which enables predicting or inferencing the geometry following manufacturing. Some first principle-based manufacturing simulation approaches are relatively slow, complicated, and/or may not provide target resolution (e.g., sub-millimeter resolution). Some machine learning approaches (e.g., some deep learning approaches) may offer improved resolution and/or speed. As used herein, the term "predict" and variations thereof may refer to determining and/or inferencing. For instance, an event or state may be "predicted" before, during, and/or after the event or state has occurred.

A machine learning model is a structure that learns based on training. Examples of machine learning models may include artificial neural networks (e.g., deep neural networks, convolutional neural networks (CNNs), dynamic graph CNNs (DGCNNs), etc.). Training the machine learning model may include adjusting a weight or weights of the machine learning model. For example, a neural network may include a set of nodes, layers, and/or connections between nodes. The nodes, layers, and/or connections may have associated weights. The weights may be adjusted to train the neural network to perform a function, such as predicting object geometry after manufacturing, object deformation, or compensation. Examples of the weights may be in a relatively large range of numbers and may be negative or positive.

An object model is data that represents an object. For example, an object model may include geometry (e.g., points, vertices, lines, polygons, etc.) that represents an object. A 3D object model is a 3D geometrical model of an object. Examples of 3D object models include computer-aided design (CAD) models, mesh models, 3D surfaces, etc. In some examples, a 3D object model may be utilized to manufacture (e.g., print) an object. In some examples, an apparatus may receive a 3D object model from another device (e.g., linked device, networked device, removable storage, etc.) or may generate the 3D object model.

In some examples of the techniques described herein, point clouds may be utilized to represent 3D objects and/or 3D object geometry. A point cloud is a set of points or locations in a 3D space. A point cloud may be utilized to represent a 3D object or 3D object model. For example, a 3D object may be scanned with a 3D scanner (e.g., depth sensor(s), camera(s), light detection and ranging (LIDAR) sensors, etc.) to produce a scanned point cloud representing the 3D object (e.g., manufactured object, 3D printed object, etc.). The scanned point cloud may include a set of points representing locations on the surface of the 3D object in 3D space. In some examples, a model point cloud may be generated from a 3D object model (e.g., computer-aided design (CAD) model). For example, a random selection of the points from a 3D object model may be performed. For instance, a model point cloud may be generated from a uniform random sampling of points from a surface of a 3D object model in some approaches. In some examples, a model point cloud may be generated by uniformly projecting points over the surface of a 3D object model mesh. For example, a uniform density of points over the whole surface or a constant number of points per triangle in the mesh may be generated in some approaches. A uniform projection may refer to selecting points (e.g., point pairs) within a threshold distance from each other. In some examples, a point cloud may be an irregular structure, where points may not necessarily correspond to a uniform grid.

Some examples of the techniques described herein may utilize a machine learning model (e.g., quantitative model, deep neural network, etc.) to align 3D shapes and/or shapes. For instance, some examples of the techniques described herein may be utilized to align a model point cloud (e.g., a point cloud of an object model, CAD model, etc.) and a scanned point cloud (e.g., a scanned point cloud of a printed object). In some examples, 3D point clouds may be generated from other geometric representations (e.g., CAD model, mesh model, voxels, etc.), such that the machine learning model may find alignments in challenging cases (e.g., different geometric representations).

Some examples of the techniques described herein may utilize a machine learning model (e.g., deep neural network) to align 3D object models. In some examples, 3D object models may be represented as CAD models, voxels, and/or point clouds. For example, a 3D object model and predicted geometry (e.g., aligned shape) may be expressed as surface coordinates (e.g., x, y, z) represented as point clouds. In some examples, points sampled from CAD models and/or printed object scans may be randomly rotated and/or translated to train a machine learning model or models (e.g., to learn alignments).

In some examples, a machine learning model or machine learning models may be trained using a point cloud or point clouds. For example, machine learning models may be trained using model point clouds and scanned point clouds. For instance, a 3D object model or models may be utilized to manufacture (e.g., print) a 3D object or objects. A model point cloud or clouds may be determined from the 3D object model(s). A scanned point cloud or point clouds may be obtained by scanning the manufactured 3D object or objects. In some examples, training data for training the machine learning model(s) may include the scanned point clouds after alignment to the model point clouds.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

FIG. 1 is a flow diagram illustrating an example of a method 100 for point cloud alignment. The method 100 and/or an element or elements of the method 100 may be performed by an apparatus (e.g., electronic device). For example, the method 100 may be performed by the apparatus 302 described in relation to FIG. 3.

In some examples, the apparatus may obtain (e.g., request, receive, scan, and/or generate) a model point cloud and a scanned point cloud. For example, the apparatus may sample a 3D object model to produce a model point cloud and/or may receive a model point cloud from another device (e.g., computer, server, printer, networked device, etc.). In some examples, the apparatus may scan an object to produce a scanned point cloud and/or may receive a scanned point cloud from a separate device (e.g., computer, server, separate scanning device, networked device, etc.).

In some examples, the apparatus may normalize the scale of the model point cloud and/or scanned point cloud. For instance, the apparatus may normalize the scale of the model point cloud and/or the scanned point cloud by fitting the model point cloud and/or the scanned point cloud to a unit sphere. In some examples, normalizing the scale of the model point cloud and/or scanned point cloud may improve convergence of the alignment techniques described herein and/or may reduce scaling and/or translation effects.

The apparatus may orient 102 a model point cloud or a scanned point cloud based on a set of initial orientations. An orientation is a position in a 3D space. For example, an orientation may express a rotation and/or translation of an object model and/or point cloud in 3D space. An initial orientation is a starting orientation of an object model and/or point cloud. For example, a set of initial orientations may include initial orientations for the model point cloud and/or scanned point cloud from which feature determination, correspondence score determination, and/or alignment procedures may be performed. In some examples, orienting 102 a model point cloud or a scanned point cloud based on a set of initial orientations may include orienting (e.g., computing an orientation of) the model point cloud and/or scanned point cloud to an orientation (e.g., rotation and/or translation) indicated by an initial orientation or initial orientations in the set of initial orientations.

In some examples, orienting 102 the model point cloud or scanned point cloud may be performed periodically and/or iteratively. For instance, a model point cloud or a scanned point cloud may be oriented according to one of the initial orientations in the set of initial orientations for feature determination, correspondence scoring, and/or alignment, after which the model point cloud or the scanned point cloud may be oriented according to a next orientation in the set of initial orientations for further (e.g., iterative) operations, etc. For example, global point cloud alignment may be challenging due to the ill-posed nature of the matter. For instance, there may be no theoretical guarantee that any approach can reach a global optimum within polynomial time. In order to alleviate the challenge, multiple initial orientations may be utilized. In some examples, the initial orientation may be iterated in the set of initial orientations until a condition is satisfied or until all initial orientations in the set of initial orientations have been used.

The size of the set of initial orientations may vary. For example, 4, 6, 8, 10, 12, 24, etc., different initial orientations may be used. In some examples, 4 different initial orientations may be utilized, including an original orientation, a 180-degree rotation on an x axis, a 180-degree rotation on a y axis, and a 180-degree rotation on a z axis. In some examples, 24 different initial orientations may be utilized. For instance, consider 0-, 90-, 180-, and 270-degree rotations for the x, y, and z axes, respectively, which provide 64 total possible transformations (e.g., 4×4×4). However, 24 orientations out the 64 possible transformations may be rotations where the determinant of the transformation matrix is 1. Accordingly, 24 initial orientations may be utilized to determine a global alignment in some examples. In some examples, the set of initial orientations may be limited to orientations that are less than or not more than 180 degrees. For instance, the set of initial orientations may be limited to orientations that are less than or not more than 180 degrees relative to an original orientation (e.g., 0 degrees for each axis).

The apparatus may determine 104, using a first portion of a machine learning model, first features of the model point cloud and second features of the scanned point cloud. A portion of a machine learning model is a part of a machine learning model. Examples of portions of a machine learning model may include a layer or layers, a node or nodes, and/or a connection or connections. In some examples, the first portion of the machine learning model may be a portion to determine, extract, and/or encode features of a point cloud or point clouds. For example, the first features may be values (e.g., data, vectors) that represent the model point cloud (e.g., shape, aspects, and/or characteristics of the model point cloud) and/or the second features may be values (e.g., data, vectors) that represent the scanned point cloud (e.g., shape, aspects, and/or characteristics of the scanned point cloud). The first features and/or the second features may be utilized to determine correspondences (e.g., correspondence scores) between the model point cloud and the scanned point cloud. In some examples, the model point cloud (e.g., original model point cloud, normalized model point cloud and/or model point cloud at an initial orientation, etc.) may be input into the first portion of the machine learning model to determine the first features. In some examples, the scanned point cloud (e.g., original scanned point cloud, normalized scanned point cloud and/or scanned point cloud at an initial orientation, etc.) may be input into the first portion of the machine learning model to determine the second features.

In some examples, the first portion of the machine learning model may be a neural network (e.g., artificial neural network (ANN), CNN, DGCNN, etc.). For instance, the first portion of the machine learning model may include edge convolution layers. In some examples, the first portion of the neural network may include multiple edge convolution layers without a global feature aggregation layer. In some examples, the first portion of the machine learning model may provide and/or indicate features for each point of a point cloud or point clouds (e.g., model point cloud and/or scanned point cloud). Some examples of the first portion of the machine learning model are given herein. Other kinds of machine learning model portions (e.g., neural networks) that operate on point clouds may be used in some examples. In some examples, the first portion of the machine learning model may be referred to as a backbone layer or layers.

In some examples, determining 104 the first features may include determining first edges from the model point cloud and/or determining 104 the second features may include determining second edges from the scanned point cloud. For instance, the apparatus may determine a first graph, where the first graph may include points of the model point cloud as vertices and determined edges. In some examples, the apparatus may determine a second graph, where the second graph may include points of the scanned point cloud as vertices and determined edges.

In some examples, the apparatus may determine edges for a point cloud (e.g., model point cloud and/or scanned point cloud). An edge is a line or association between points. In some examples, the apparatus 302 may determine edges from a point cloud by determining neighbor points for each point of the point cloud. A neighbor point is a point that meets a criterion relative to another point. For example, a point or points that are nearest to another point (in terms of Euclidean distance, for example) may be a neighbor point or neighbor points relative to the other point. In some examples, the edges may be determined as lines or associations between a point and corresponding neighbor points.

In some examples, the apparatus may determine the nearest neighbors using a K nearest neighbors (KNN) approach. For example, K may be a value that indicates a threshold number of neighbor points. For instance, the apparatus may determine the K points that are nearest to another point as the K nearest neighbors.

In some examples, the apparatus may generate edges between a point and the corresponding neighbor points. For instance, the apparatus may store a record of each edge between a point and the corresponding neighbor points. In some approaches, a point (of a point cloud, for instance) may be denoted $x_i=(x_i, y_i, z_i)$, where $x_i$ is a location of the point in an x dimension or width dimension, $y_i$ is a location of the point in a y dimension or depth dimension, $z_i$ is a location of the point in a z dimension or height dimension, and i is an index for a point cloud. For instance, for each point $x_i$, the apparatus may find neighbor points (e.g., KNN). The apparatus may generate edges between each point and corresponding neighbor points. In some examples, determining the edges may generate a graph G=(V, E), where V are the points (or vertices) and E are the edges of the graph G. A graph is a data structure including a vertex or vertices and/or an edge or edges. An edge may connect two vertices. In some examples, a graph may or may not be a visual display or plot of data. For example, a plot or visualization of a graph may be utilized to illustrate and/or present a graph.

In some examples, determining the edges may be based on distance metrics. For instance, the apparatus may determine a distance metric between a point and a candidate point. A candidate point is a point in the point cloud that may potentially be selected as a neighbor point. In some examples, the neighbor points (e.g., KNN) may be determined in accordance with a Euclidean distance as provided in Equation (1).

$$d(x_i, x_j) = \sqrt{(x_i, x_j)^2 + (y_i, y_j)^2 + (z_i, z_j)^2} \qquad (1)$$

In Equation (1), j is an index for points where j≠i. The K candidate points that are nearest to the point may be selected as the neighbor points and/or edges may be generated between the point and the K nearest candidate points. K may be predetermined or determined based on a user input.

In some examples, the apparatus may determine a local value for each of the edges. A local value is a value (or vector of values) that indicates local neighborhood information. In some examples, the local value may be determined as $(x_j-x_i)$. For instance, the local value may be a difference between the point and a neighbor point. In some examples, the local value may be weighted with a local weight $\theta_m$ (e.g., $\theta_m \cdot (x_j-x_i)$). In some examples, the local weight may be estimated during machine learning model training for learning local features and/or representations. For instance, $\theta_m \cdot (x_j-x_i)$ may capture local neighborhood information (e.g., local shape information). Examples of the local weight may be in a relatively large range of numbers and may be negative or positive.

In some examples, the apparatus may determine a combination of the local value and a global value for each of the edges. A global value is a value that indicates global information (e.g., global shape information). For instance, the global value may be the point $x_i$. In some examples, the global value may be weighted with a global weight $\phi_m$ (e.g., $\phi_m \cdot x_i$). In some examples, the global weight may be estimated during machine learning model training for learning global features and/or representations. For instance, $\phi_m \cdot x_i$ may explicitly adopt global shape structure. In some examples, determining 104 the first features and the second features may include determining a combination of a corresponding local value and a corresponding global value for each of the first edges and the second edges. For instance, determining the combination of the local value and the global value for each of the edges may include summing the local value and the global value (with or without weights) for each of the edges. For instance, the apparatus may calculate $\theta_m \cdot (x_j-x_i)+\phi_m \cdot x_i$. Examples of the global weight may be in a relatively large range of numbers and may be negative or positive.

In some examples, the apparatus may determine an edge feature for each of the edges of the graph(s) (e.g., first graph for the model point cloud and/or second graph for the scanned point cloud). For example, the apparatus (e.g., processor) may determine an edge feature for each of the edges determined from a point cloud (e.g., model point cloud and/or scanned point cloud). An edge feature is a value (or vector of values) that indicates a relationship between points (e.g., neighbor points). In some examples, an edge feature may represent a geometrical structure associated with an edge connecting two points (e.g., neighbor points). In some examples, the apparatus may determine a local value for each of the edges, may determine a combination of the local value and a global value for each of the edges, and/or may apply an activation function to each of the combinations to determine the edge feature. For instance, the apparatus may utilize the first portion of the machine learning model to determine the edge features.

In some examples, the apparatus may determine an edge feature based on the combination for each of the edges. In some examples, the apparatus may determine the edge feature by applying an activation function to the combination for each of the edges. For instance, the apparatus may determine the edge feature in accordance with Equation (2).

$$e_{ijm} = \text{ReLU}(\theta_m \cdot (x_j - x_i) + \phi_m \cdot x_i) \tag{2}$$

In Equation (2), $e_{ijm}$ is the edge feature, m is a channel index for a channel (e.g., convolution channel) of a machine learning model, and ReLU is a rectified linear unit activation function. For instance, the rectified linear unit activation function may take a maximum of 0 and the input value. Accordingly, the rectified linear unit activation function may output zeros for negative input values and may output values equal to positive input values. In some examples, the apparatus may determine edge features for each edge at each channel m.

In some examples, the apparatus may convolve the edge features to determine features (e.g., first features and/or second features). In some examples, the apparatus may convolve the edge features by summing edge features. For instance, the apparatus may convolve the edge features in accordance with Equation (3).

$$x_{im'} = \sum_{j:(i,j)\in E} e_{ijm} \tag{3}$$

In Equation (3), $x_{im'}$ is a feature of a point cloud (e.g., a feature of an i-th vertex of a graph of a model point cloud or a scanned point cloud). For instance, an apparatus may calculate the m-th layer output of an i-th vertex in accordance with Equation (3) in some examples. As illustrated by Equation (3), convolution on the graph (e.g., KNN graph) may be transferred to a regular convolution.

The apparatus may determine 106, using a second portion of the machine learning model, correspondence scores between the first features and the second features based on the set of initial orientations. A correspondence score is a value that indicates a likelihood or probability of correspondence. For example, a correspondence score may be a value that indicates a likelihood or probability that a feature from the first features or point from the model point cloud corresponds to (e.g., is associated with, matches, etc.) a feature from the second features or point from the scanned point cloud. For instance, a correspondence score may indicate a probability that a point pair between the model point cloud and the scanned point cloud are from corresponding object structures between the object model and the scanned object. In some examples, the second portion of the machine learning model may be a portion to determine (e.g., predict, infer, etc.) correspondence scores between point clouds (e.g., between the model point cloud and the scanned point cloud).

In some examples, determining 106 the correspondence scores may be based on the set of initial orientations. For instance, the first features and the second features may not share exact local and/or global features, since point cloud features may not be rotation invariant. The second portion of the machine learning model may be utilized to find local and/or global dependencies between point clouds (e.g., the model point cloud and the scanned point cloud). The local and/or global dependencies may be associated with and/or may be expressed as the correspondence scores.

In some examples, the second portion of the machine learning model may include an attention layer or attention layers. An attention layer is a layer than includes an attention function or attention functions. For example, an attention function may be utilized to determine a relevance or correspondence between aspects (e.g., points, features, etc.) of the model point cloud and the scanned point cloud. In some examples, an attention layer may utilize a set of queries (q), keys (k) and score values (v), where queries may be a point cloud (e.g., features of a model point cloud or scanned point cloud), keys may be another point cloud (e.g., features of a scanned point cloud or model point cloud), and score values may be the correspondence scores for each point cloud pair, respectively. In some examples, an attention layer includes a scaled dot product attention function or functions. A scaled dot product attention function is a function that performs a dot product and scaling on factors (e.g., features of a model point cloud and features of a scanned point cloud). For example, q, k, and v may denote queries, keys, and score values corresponding to the dimensions of $d_q$, $d_k$, $d_v$, respectively. In some examples, a scaled dot product attention function may be utilized to compute the dot products of the queries with all keys, divide each by $\sqrt{d_k}$, and apply a softmax function to determine the weights on the correspondence scores in accordance with Equation (4).

$$\text{Attention}(q, k, v) = \text{softmax}\left(\frac{qk^T}{\sqrt{d_k}}\right)v \tag{4}$$

In Equation (4), Attention is the attention function, softmax is the softmax function, and T denotes transpose.

In some examples, a multi-head attention function may be utilized. For instance, a multi-head attention function may be utilized to perform a scaled dot product attention function h times with different linear projections $W_i$ (I=1, . . . , h) and concatenate the results. In some examples, a multi-head attention function may be utilized to find the correspondence scores between the model point cloud and the scanned point cloud more efficiently. An example of a multi-head attention function is given in Equation (5).

$$\text{Multihead}(q,k,v) = \text{concat}(\text{head}_1, \ldots, \text{head}_h)W^O,$$

$$\text{where head}_i = \text{Attention}(qW_i^q, kW_i^k, vW_i^v) \tag{5}$$

In Equation (5), Multihead is the multihead function, concat is a concatenation function, $W^O$ is a linear operator of aggregating information from all h heads, $W_i^q$ is a linear projection i of q, $W_i^k$ is a linear projection i of k, and $W_i^v$ is a linear projection i of v.

The second portion of the machine learning model (e.g., attention layer(s)) may be trained to infer the correspondence scores (e.g., v). For example, the apparatus may provide the first features and the second features to the second portion of the machine learning model, where the first features and/or second features are associated with an initial orientation of the set of initial orientations. The second portion of the machine learning model may be utilized to determine the correspondence scores between the first features and the second features.

The apparatus may globally align 108 the model point cloud and the scanned point cloud based on the correspondence scores. For example, the apparatus may globally align the model point cloud to the scanned point cloud or may globally align the scanned point cloud to the model point cloud based on the correspondence scores. In some examples, the apparatus may use a third portion of the machine learning model to globally align 108 the model point cloud and the scanned point cloud. For instance, the third portion of the machine learning model may infer and/or predict a rotation matrix and/or translation matrix to align the model point cloud and the scanned point cloud based on the correspondence scores.

In some examples, the second portion of the machine learning model may provide the correspondence scores (e.g., probabilities) for each point in a first point cloud (e.g., model point cloud or scanned point cloud) to a second point cloud (e.g., scanned point cloud or model point cloud). For instance, the correspondence scores may indicate correspondence probabilities of point pairs between the model point cloud and the scanned point cloud. The apparatus (e.g., third portion of the machine learning model) may determine point cloud pairs (X, Y), where $X=\{x_i, \ldots, x_n\}$ are the points of the first point cloud and $Y=\{y_1, \ldots, y_n\}$ are the corresponding points of the second point cloud. From the point cloud pairs, the apparatus (e.g., third portion of the machine learning model) may compute a closed form solution of the rotation matrix $R_{xy}$ and translation matrix $T_{xy}$ from the first point cloud X to the second point cloud Y. For example, the apparatus may compute the rotation matrix and translation matrix using a singular value decomposition of a covariance matrix $H=USV^T=\Sigma_{i=1}^{N}(x_i-\bar{x})(y_i-\bar{y})^T$, where U is an orthogonal matrix, S is a diagonal matrix, V is an orthogonal matrix, T denotes transpose, and $\bar{x}$ and $\bar{y}$ are centroids of X and Y, respectively. Examples of the rotation and translation matrices are given in Equation (6).

$$R_{xy}=VU^T \text{ and } T_{xy}=-R_{xy}\bar{x}+\bar{y} \qquad (6)$$

In some examples, the apparatus (e.g., third portion of the machine learning model) may update the first point cloud X with the computed rotation matrix and translation matrix to produce an updated point cloud X*. In some examples, the apparatus (e.g., machine learning model) may iterate determining 104 the features (e.g., first features and second features) and determining 106 the correspondence scores based on the updated point cloud(s) X*. In some examples, globally aligning 108 the model point cloud and the scanned point cloud may include searching within a ±90 degree rotation and a ±1 translation range for each axis from the initial orientations (e.g., from the current initial orientation). For example, limiting the search to within the ranges may help prevent overfitting and/or increase stability. After a quantity of iterations (e.g., after a p-th iteration) the rotation and translation matrices may be expressed in accordance with Equation (7) with respect to the updated point cloud $X^p=\{x_1^p, \ldots, x_n^p\}$.

$$R_{xy}^p=V^p(U^p)^T \text{ and } T_{xy}^p=-R_{xy}^p\bar{x}+\bar{y} \qquad (7)$$

In some examples, the apparatus may iterate the initial orientation in the set of initial orientations until a fitness criterion is satisfied or until all initial orientations in the set of initial orientations have been used. For instance, globally aligning 108 the model point cloud may produce a global alignment associated with an initial orientation. The apparatus may determine whether the global alignment satisfies a fitness criterion. For example, the apparatus may determine (e.g., compute) a fitness score. A fitness score is a value that indicates a degree of alignment. In some examples, the apparatus may determine the fitness score by computing an average of closest distances between the model point cloud and the scanned point cloud based on the global alignment. For instance, the fitness score may be based on an average of closest distances between points of the model point cloud and an aligned scanned point cloud. Smaller distances (e.g., average distance) may correspond to a higher fitness score. For instance, the apparatus may subtract the average distance from a value (e.g., 1) or use another function to compute the fitness score. In some examples, the fitness criterion may be a fitness threshold. In some examples, the fitness threshold may be user-defined. For instance, if the fitness score is greater than the fitness threshold (e.g., 0.9, 0.8, etc.), the fitness criterion may be satisfied, which may be utilized to select a global alignment. In some cases, a greatest fitness score may be utilized to select the global alignment. In a case that the global alignment does not satisfy the fitness criterion, the apparatus may iterate the initial orientation, determine 104 the first features and second features, determine 106 correspondence scores, and globally align 108 the model point cloud and the scanned point cloud based on the iterated initial orientation. For instance, the apparatus may determine whether a first global alignment associated with a first initial orientation satisfies a fitness criterion. The apparatus may determine a second global alignment associated with a second initial orientation in response to determining that the first global alignment does not satisfy the fitness criterion. In a case that the global alignment satisfies the fitness criterion, the global alignment may be utilized and/or selected. For instance, the apparatus may not iterate the initial orientation in a case that the fitness criterion is satisfied.

In some examples, if each global alignment respectively associated with each initial orientation in the set of initial orientations does not satisfy the fitness criterion, the apparatus may select a global alignment with a greatest fitness score. For instance, if globally aligning 108 the model point cloud and the scanned point cloud does not produce a global alignment that satisfies the fitness criterion for any of the initial orientations in the set of initial orientations, the apparatus may select the global alignment with the greatest fitness score. For example, the apparatus may select a global alignment with a greatest fitness score in response to determining that the fitness criterion is not satisfied for global alignments associated with each of the set of initial orientations.

In some examples, the apparatus may refine a global alignment. For example, the apparatus may align the model point cloud and the scanned point cloud based on the global alignment at a finer scale than the global alignment. For instance, the apparatus may align the model point cloud and the scanned point cloud using an iterative closest point (ICP) technique. In some examples, if the 3D object model is represented as a mesh (in addition to the model point cloud, for instance), the apparatus may utilize a plane-to-plane ICP approach. In some examples, if the 3D object model is not represented as a mesh, the apparatus may utilize a point-toplane ICP approach. An ICP technique may be utilized to determine a closed form solution of rotation and translation matrices. In some examples, rotation and translation matrices may be determined in accordance with Equation (6). In some examples, the apparatus may utilize the ICP technique to refine the correspondences between the model point cloud and the scanned point cloud with respect to a fixed rotation matrix $R_{xy}$ and translation matrix $T_{xy}$ using a matching function $m(x_i, Y)$ as given in Equation (8).

$$m(x_i, Y) = \operatorname{argmin}_j \|R_{xy} x_i + T_{xy} - y_j\| \qquad (8)$$

In some examples, the apparatus may iterate determining rotation and translation matrices and using the matching function. For instance, the apparatus may refine the global alignment by iterating Equations (6) and (8) for a set of iterations (e.g., q iterations).

In some examples, the apparatus may perform an operation based on the global alignment and/or the refined alignment. In some examples, the apparatus may compare the scanned point cloud with the model point cloud based on an alignment to determine a deformation of the scanned object. A deformation is a difference or amount of change of an object relative to a model. For example, a deformation is a change or disparity in object geometry from a 3D object model. A deformation may occur during manufacturing due to thermal diffusion, thermal change, gravity, manufacturing errors, etc. In some examples, the deformation may be expressed as a point cloud, mesh model, 3D object model (e.g., CAD model), etc. Comparing the scanned point cloud with the model point cloud may include determining a metric or metrics that indicate a comparison and/or may include determining an illustration or illustrations (e.g., plot(s), image(s), etc.) that indicate a comparison. Some examples of comparison metrics may include Euclidean distance(s) between the scanned point cloud and the model point cloud, average (e.g., mean, median, and/or mode) distance between the scanned point cloud and the model point cloud, a variance between the scanned point cloud and the model point cloud, a standard deviation between the scanned point cloud and the model point cloud, a difference or differences between the scanned point cloud and the model point cloud, average difference between the scanned point cloud and the model point cloud, mean-squared error between the scanned point cloud and the model point cloud, a plot that illustrates the scanned point cloud with the model point cloud, a plot that illustrates a degree of error or difference over the surface of the model point cloud (or scanned point cloud), etc.

In some examples, the apparatus may provide the global alignment, refined alignment, aligned model point cloud and scanned point cloud, and/or the comparison of the alignment model point cloud and the scanned point cloud. For instance, the apparatus may store the global alignment, refined alignment, aligned model point cloud and scanned point cloud, and/or the comparison, may send the global alignment, refined alignment, aligned model point cloud and scanned point cloud, and/or the comparison to another device, and/or may present the global alignment, refined alignment, aligned model point cloud and scanned point cloud, and/or the comparison (on a display and/or in a user interface, for example).

In some examples, the global alignment, refined alignment, aligned model point cloud and scanned point cloud, and/or the comparison may provide information on how an object (e.g., manufactured object) may be deformed. In some examples, accurate deformation information may be beneficial in compensating for the deformation. For example, the apparatus may determine a compensated object model based on the global alignment, refined alignment, aligned model point cloud and scanned point cloud, and/or the comparison. In some examples, the compensated object model may be utilized to manufacture (e.g., 3D print) an object. Accordingly, determining the global alignment, refined alignment, aligned model point cloud and scanned point cloud, and/or the comparison may be utilized to manufacture an object with more accurate geometry.

In some examples, the apparatus may utilize the global alignment, refined alignment, aligned model point cloud and scanned point cloud, and/or the comparison to compensate for the predicted deformations. For instance, the apparatus may adjust the 3D object model (e.g., CAD model) and/or printing variables (e.g., amount of agent, thermal exposure time, etc.) to reduce or avoid error or geometric inaccuracy in the manufactured object. In some approaches, the apparatus may perform iterative compensation. For instance, the apparatus may determine the global alignment, refined alignment, aligned model point cloud and scanned point cloud, and/or the comparison, may adjust the 3D object model and/or printing variables, and may repeat determining the global alignment, refined alignment, aligned model point cloud and scanned point cloud, and/or the comparison using the adjustment(s). Adjustments that reduce object deformation may be retained and/or amplified. Adjustments that increase object deformation may be reversed and/or reduced. This procedure may iterate until the deformation is reduced to a target amount. In some examples, a 3D printer may print the adjusted (e.g., deformation-reduced and/or improved) 3D model and/or compensated model.

Figure 2:
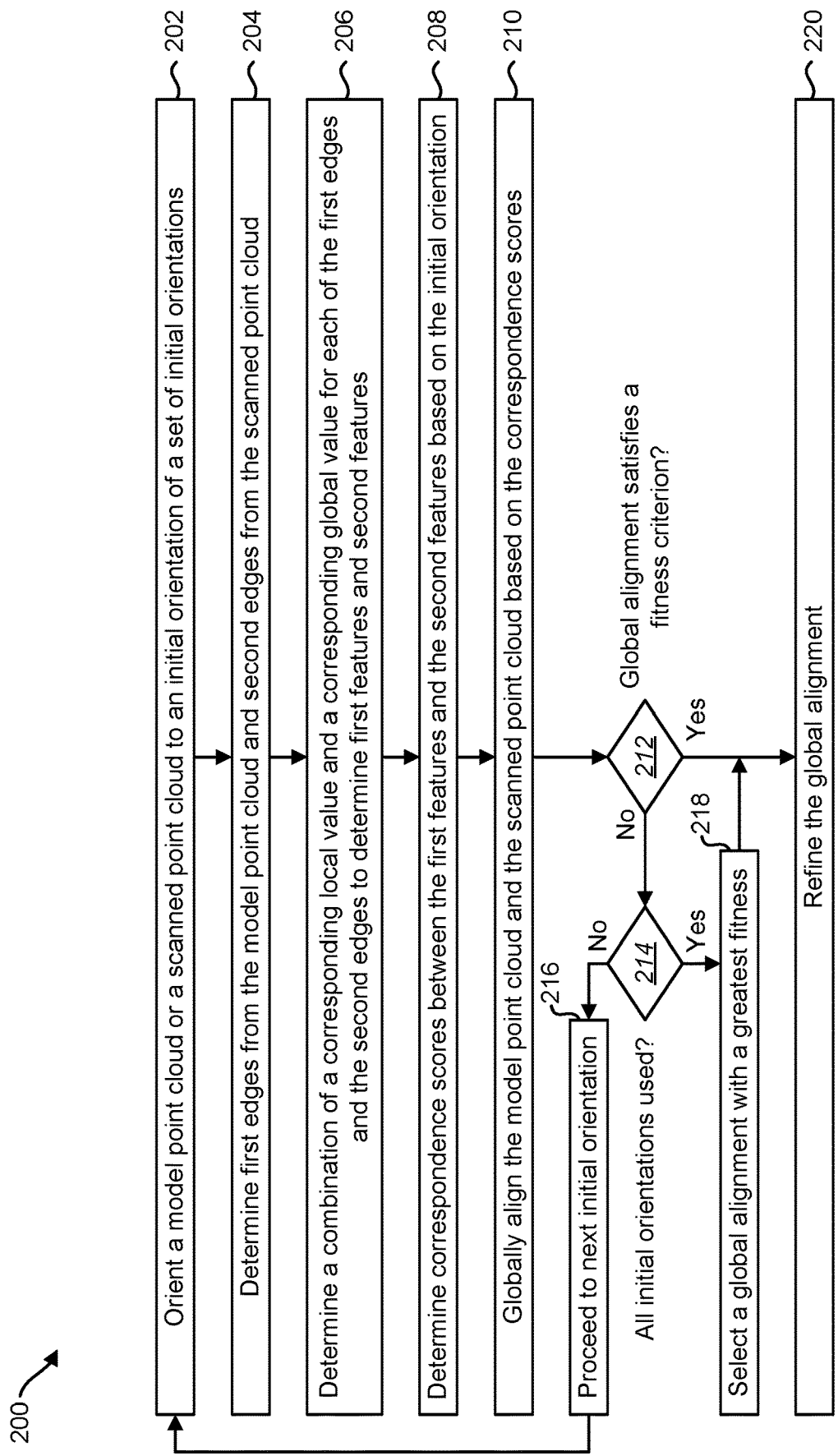
FIG. 2 is a flow diagram illustrating another example of a method for point cloud alignment.

FIG. 2 is a flow diagram illustrating another example of a method 200 for point cloud alignment. The method 200 and/or an element or elements of the method 200 may be performed by an apparatus (e.g., electronic device). For example, the method 200 may be performed by the apparatus 302 described in relation to FIG. 3.

The apparatus may orient 202 a model point cloud or a scanned point cloud to an initial orientation of a set of initial orientations. In some examples, orienting 202 the model point cloud or the scanned point cloud may be performed as described in relation to FIG. 1.

The apparatus may determine 204 first edges from the model point cloud and second edges from the scanned point cloud. In some examples, determining 204 the first edges and the second edges may be performed as described in relation to FIG. 1.

The apparatus may determine 206 a combination of a corresponding local value and a corresponding global value for each of the first edges and the second edges to determine first features and second features. In some examples, determining 206 the combination may be performed as described in relation to FIG. 1.

The apparatus may determine 208 correspondence scores between the first features and the second features based on the initial orientation. In some examples, determining 208 the correspondence scores may be performed as described in relation to FIG. 1.

The apparatus may globally align 210 the model point cloud and the scanned point cloud based on the correspondence scores. In some examples, globally aligning 210 the model point cloud and the scanned point cloud may be performed as described in relation to FIG. 1.

The apparatus may determine 212 whether a global alignment satisfies a fitness criterion. In some examples, determining 212 whether the global alignment satisfies the fitness criterion may be performed as described in relation to FIG. 1.

In a case that the global alignment satisfies the fitness criterion, the apparatus may refine 220 the global alignment. In some examples, refining 220 the global alignment may be performed as described in relation to FIG. 1.

In a case that the global alignment does not satisfy the fitness criterion, the apparatus may determine 214 whether all initial orientations have been used. For example, the apparatus may determine whether all of the initial orientations in the set of initial orientations have been used to orient the model point cloud or the scanned point cloud. For instance, the apparatus may maintain a record, a count, and/or a state that indicates whether all of the initial orientations in the set of initial orientations have been used.

In a case that not all of the initial orientations have been used, the apparatus may proceed 216 to the next orientation. For example, the apparatus may select a next initial orientation from the set of initial orientations and may return to orient 202 the model point cloud or the scanned point cloud to a next initial orientation of the set of initial orientations.

In a case that all of the initial orientations have been used, the apparatus may select 218 a global alignment with a greatest fitness score. In some examples, selecting the global alignment with the greatest fitness score may be performed as described in relation to FIG. 1. The apparatus may refine 220 the global alignment. In some examples, refining 220 the global alignment may be performed as described in relation to FIG. 1.

In some examples, the apparatus may perform an operation based on the global alignment and/or the refined alignment. In some examples, performing an operation based on the global alignment and/or the refined alignment may be performed as described in relation to FIG. 1. For example, the apparatus may compare the model point cloud and the scanned point cloud, may determine deformation information, may provide the global alignment and/or refined alignment, may present the global alignment and/or refined alignment, may compensate for a deformation based on the global alignment and/or refined alignment, may print an object based on the global alignment and/or the refined alignment, etc. In some examples, operation(s) and/or element(s) of the method 200 may be omitted and/or combined.

Figure 3:
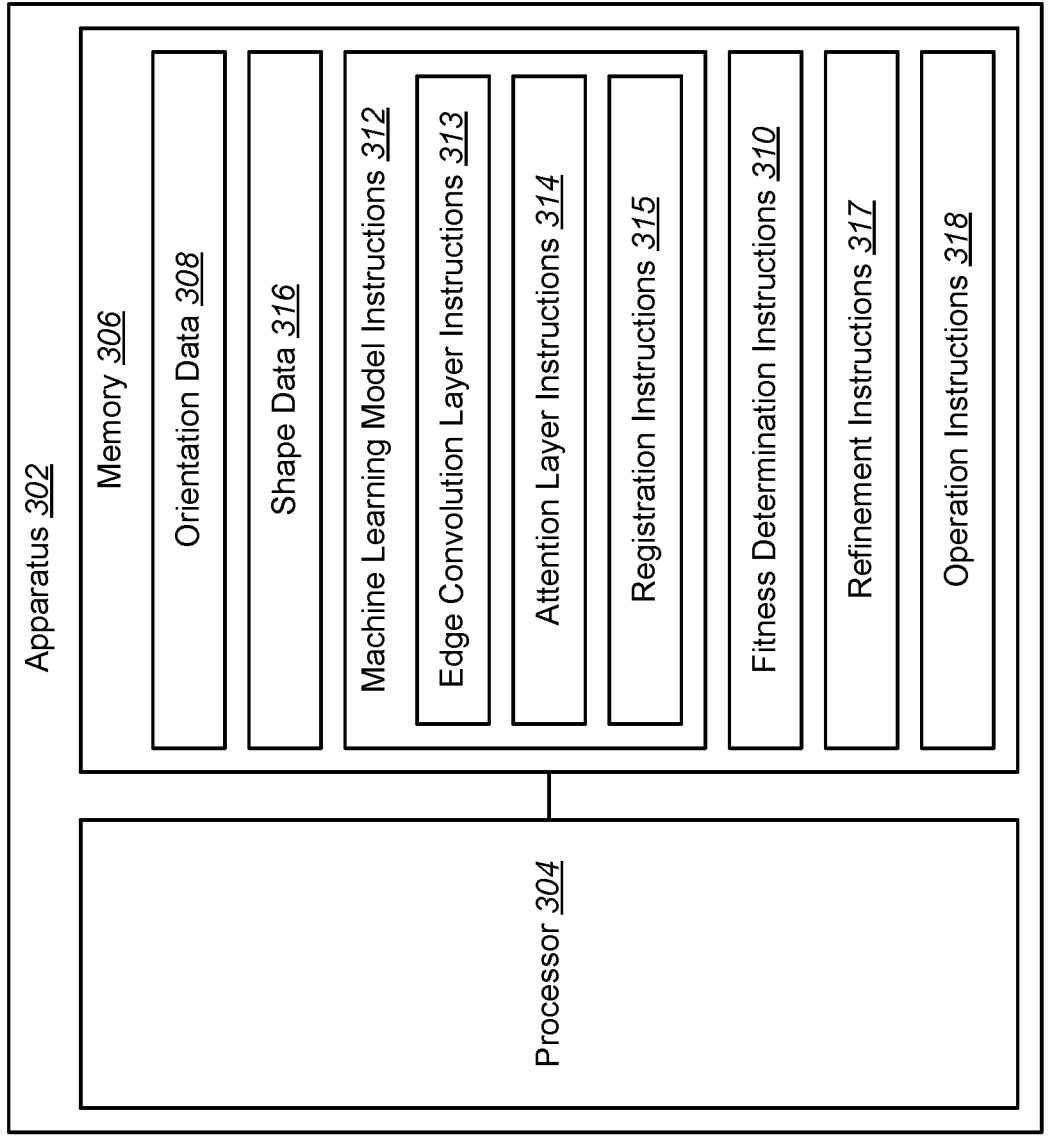
FIG. 3 is a block diagram of an example of an apparatus that may be used in point cloud alignment.

FIG. 3 is a block diagram of an example of an apparatus 302 that may be used in point cloud alignment. The apparatus 302 may be a computing device, such as a personal computer, a server computer, a printer, a 3D printer, a smartphone, a tablet computer, a scanner, a camera, etc. The apparatus 302 may include a processor 304 and/or memory 306. The processor 304 may be in electronic communication with the memory 306. In some examples, the apparatus 302 may be in communication with (e.g., coupled to, have a communication link with) an additive manufacturing device (e.g., a 3D printing device) and/or a scanning device. In some examples, the apparatus 302 may be an example of a 3D printing device. The apparatus 302 may include additional components (not shown) and/or some of the components described herein may be removed and/or modified without departing from the scope of this disclosure.

The processor 304 may be and/or include any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. The processor 304 may fetch, decode, and/or execute instructions (e.g., fitness determination instructions 310, machine learning model instructions 312, edge convolution layer instructions 313, attention layer instructions 314, registration instructions 315, refinement instructions 317, and/or operation instructions 318) stored in the memory 306. In some examples, the processor 304 may include an electronic circuit or circuits that include electronic components for performing a functionality or functionalities of the instructions (e.g., fitness determination instructions 310, machine learning model instructions 312, edge convolution layer instructions 313, attention layer instructions 314, registration instructions 315, refinement instructions 317, and/or operation instructions 318). In some examples, the processor 304 may perform one, some, or all of the operations, elements, etc., described in relation to one, some, or all of FIGS. 1-5.

The memory 306 may be any electronic, magnetic, optical, or other physical storage device that contains or stores electronic information (e.g., instructions and/or data). Thus, the memory 306 may be, for example, Random Access Memory (RAM), Electrically Erasable Programmable Read-Only Memory (EEPROM), a storage device, an optical disc, and the like. In some implementations, the memory 306 may be a non-transitory tangible machine-readable storage medium, where the term "non-transitory" does not encompass transitory propagating signals.

In some examples, the apparatus 302 may also include a data store (not shown) on which the processor 304 may store information. The data store may be volatile and/or non-volatile memory, such as Dynamic Random-Access Memory (DRAM), EEPROM, magnetoresistive random-access memory (MRAM), phase change RAM (PCRAM), memristor, flash memory, and the like. In some examples, the memory 306 may be included in the data store. In some examples, the memory 306 may be separate from the data store. In some approaches, the data store may store similar instructions and/or data as that stored by the memory 306. For example, the data store may be non-volatile memory and the memory 306 may be volatile memory.

In some examples, the apparatus 302 may include an input/output interface (not shown) through which the processor 304 may communicate with an external device or devices (not shown), for instance, to receive and/or store information pertaining to an object or objects for which alignment may be performed. The input/output interface may include hardware and/or machine-readable instructions to enable the processor 304 to communicate with the external device or devices. The input/output interface may enable a wired or wireless connection to the external device or devices. In some examples, the input/output interface may further include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions into the apparatus 302. In some examples, the apparatus 302 may receive orientation data 308 and/or shape data 316 from an external device or devices (e.g., 3D scanner, removable storage, network device, etc.).

In some examples, the memory 306 may store orientation data 308. The orientation data 308 may include and/or indicate a set of initial orientations. For example, the orientation data 308 may include an array, list, vector, table, etc., of initial orientations. The initial orientations may be expressed as angular rotations, matrices, quaternions, numeric values, etc. The orientation data 308 may be generated by the apparatus 302, received from another device, and/or received through an interface device (e.g., keyboard, mouse, touchscreen, touchpad, etc.). For instance, the apparatus 302 may determine 0-, 90-, 180-, and 270-degree rotations for x, y, and z axes, where the determinant of the transformation matrix is 1. In some examples, the orientation data 308 may include 2, 4, 6, 8, 16, 20, 24, etc., initial orientations.

In some examples, the memory 306 may store shape data 316. The shape data 316 may be generated by the apparatus 302 and/or received from another device. Some examples of shape data 316 include a 3D manufacturing format (3MF) file or files, a 3D computer-aided design (CAD) image, object shape data, mesh data, geometry data, point cloud, and/or point clouds, etc. The shape data 316 may indicate the shape of an object or objects. For instance, the shape data 316 may include and/or indicate a model point cloud and/or a scanned point cloud. For example, the processor 304 may determine a model point cloud from a 3D object model indicated by the shape data 316. The model point cloud may be stored with the shape data 316. In some examples, the apparatus may receive a 3D scan or scans of an object or objects from another device (e.g., linked device, networked device, removable storage, etc.) or may capture the 3D scan that may indicate a scanned point cloud.

The memory 306 may store machine learning model instructions 312. The machine learning model instructions 312 may include and/or indicate a structure of a machine learning model. For example, the machine learning model instructions 312 may include edge convolution layer instructions 313, attention layer instructions 314, and/or registration instructions 315. The processor 304 may execute the machine learning model instructions 312 to determine features for a point cloud or point clouds, determine point correspondence scores, and/or register point clouds.

The edge convolution layer instructions 313 may include and/or indicate edge convolution layer(s) of the machine learning model. The processor 304 may execute the edge convolution layer instructions 313 to determine, for an orientation of a set of initial orientations, a feature for each point of a model point cloud and a scanned point cloud using edge convolution layers of the machine learning model. For instance, the processor 304 may utilize a first orientation from a set of initial orientations of the orientation data 308 to orient the model point cloud and/or the scanned point cloud to the first orientation. The processor 304 may execute the edge convolution layer instructions 313 to determine a feature for each point of the model point cloud and the scanned point cloud, where the model point cloud or the scanned point cloud is oriented according to the first orientation. In some examples, the edge convolution layer(s) may function as described in relation to FIG. 1 and/or FIG. 2 to produce the feature for each point.

The attention layer instructions 314 may include and/or indicate attention layer(s) of the machine learning model. The processor 304 may execute the attention layer instructions 314 to determine, for an orientation (e.g., first orientation) of the set of initial orientations, point correspondence scores for point pairs between the model point cloud and the scanned point cloud using attention layers of the machine learning model. A point correspondence score is a correspondence score for a point pair. For instance, the processor 304 may execute the attention layer instructions 314 to determine point correspondence scores for point pairs (where each point pair includes a point from the model point cloud and a point from the scanned point cloud, for example) based on features (e.g., associated feature pairs) from the edge convolution layer(s). In some examples, the attention layer(s) may function as described in relation to FIG. 1 and/or FIG. 2 to produce the point correspondence scores.

The registration instructions 315 may include and/or indicate a portion of the machine learning model. For example, the registration instructions 315 may include and/or indicate a portion or portions of the machine learning model for point matching and/or registration. Registration is a procedure to align data (e.g., point clouds). In some examples, the machine learning model may include a registration layer or layers (e.g., rotation and/or translation prediction layers). In some examples, the registration instructions 315 may be utilized to perform operations of the registration layer(s). The processor 304 may execute the registration instructions 315 to register the model point cloud and the scanned point cloud based on the correspondence scores for an orientation (e.g., the first orientation). For instance, the processor 304 may execute the registration instructions 315 to globally align the model point cloud and the scanned point cloud based on the correspondence scores for the first orientation. In some examples, the registration may be performed as described in relation to FIG. 1 and/or FIG. 2 to produce a registration (e.g., global alignment) of the model point cloud and the scanned point cloud.

The memory may store fitness determination instructions 310. The processor 304 may execute the fitness determination instructions 310 to determine whether a fitness criterion is satisfied for an orientation (e.g., the first orientation). For instance, the processor 304 may execute the fitness determination instructions 310 to determine whether the registration produced by the machine learning model satisfies a fitness criterion (e.g., fitness threshold). In some examples, the fitness determination may be performed as described in relation to FIG. 1 and/or FIG. 2.

In some examples, in response to determining that the fitness criterion is not satisfied, the processor 304 may perform an operation or operations for a next orientation. For instance, the processor 304 may select a next orientation (after the first orientation, for example) from the set of initial orientations of the orientation data. The processor 304 may execute the edge convolution layer instructions 313 to determine, for the next orientation in the set of orientations, a next feature for each point of the model point cloud and of the scanned point cloud using the edge convolution layers of the machine learning model. The processor 304 may execute the attention layer instructions 314 to determine, for the next orientation of the set of initial orientations, next point correspondence scores for next point pairs between the model point cloud and the scanned point cloud using attention layers of the machine learning model. The processor 304 may execute the registration instructions 315 to register the model point cloud and the scanned point cloud based on the correspondence scores for the next orientation. The processor 304 may execute the fitness determination instructions 310 to determine whether the fitness criterion is satisfied for the next orientation. The processor 304 may repeat the procedure until the fitness criterion is satisfied for an orientation, or until all of the orientations in the set of initial orientations have been used as described in relation to FIG. 1 and/or FIG. 2.

The memory may store refinement instructions 317. The processor 304 may execute the refinement instructions 317 to refine a registration for an orientation (e.g., the first orientation) in response to determining that the fitness criterion is satisfied for the first orientation. In some examples, the registration (e.g., global alignment) refinement may be performed as described in relation to FIG. 1 and/or FIG. 2.

In some examples, the processor 304 may execute the operation instructions 318 to perform an operation. For example, the apparatus 302 may perform an operation based on the registered model point cloud and scanned point cloud. For instance, the processor 304 may present the registered model point cloud and/or scanned point cloud on a display, may store the registered model point cloud and/or scanned point cloud in the memory 306, and/or may send the registered model point cloud and/or scanned point cloud to another device or devices. In some examples, the apparatus 302 (e.g., processor 304) may compare the registered model point cloud and scanned point cloud. In some examples, the apparatus 302 may perform a comparison as described in relation to FIG. 1 and/or FIG. 2. For example, the apparatus 302 may provide and/or present the comparison(s) as described in relation to FIG. 1 and/or FIG. 2.

In some examples, the apparatus 302 (e.g., processor 304) may manufacture (e.g., print) an object. For example, the apparatus 302 may print an object based on the registered model point cloud and/or scanned point cloud as described in relation to FIG. 1 and/or FIG. 2. For instance, the processor 304 may drive model setting based on a deformation-compensated 3D model that is based on the registered model point cloud and/or scanned point cloud. In some examples, the object or objects may be scanned to produce a scanned point cloud or clouds.

In some examples, the processor 304 may train a machine learning model or models. For example, the processor 304 may train the machine learning model using shape data 316. For example, the machine learning model may be trained using model point clouds, scanned point clouds, point cloud registrations, etc.

Figure 4:
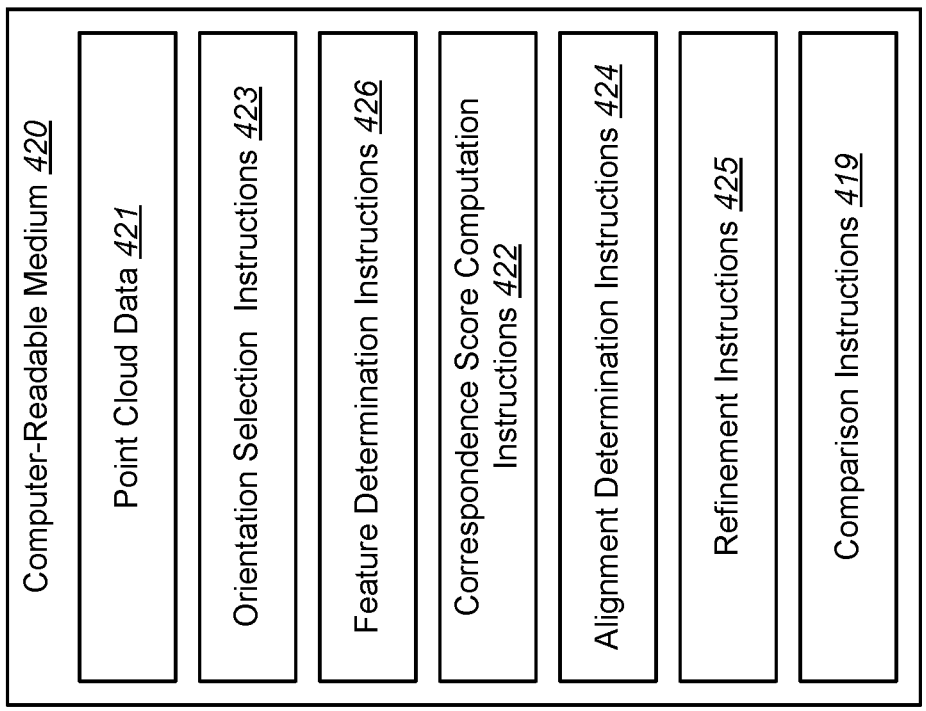
FIG. 4 is a block diagram illustrating an example of a computer-readable medium for point cloud alignment.

FIG. 4 is a block diagram illustrating an example of a computer-readable medium 420 for point cloud alignment. The computer-readable medium 420 may be a non-transitory, tangible computer-readable medium 420. The computer-readable medium 420 may be, for example, RAM, EEPROM, a storage device, an optical disc, etc. In some examples, the computer-readable medium 420 may be volatile and/or non-volatile memory, such as DRAM, EEPROM, MRAM, PCRAM, memristor, flash memory, etc. In some implementations, the memory 306 described in relation to FIG. 3 may be an example of the computer-readable medium 420 described in relation to FIG. 4.

The computer-readable medium 420 may include code (e.g., data and/or executable code or instructions). For example, the computer-readable medium 420 may include point cloud data 421, feature determination instructions 426, correspondence score computation instructions 422, orientation selection instructions 423, alignment determination instructions 424, refinement instructions 425, and/or comparison instructions 419.

In some examples, the computer-readable medium 420 may store point cloud data 421. Some examples of point cloud data 421 include samples of a 3D object model (e.g., 3D CAD file), point cloud(s), and/or scan data, etc. The point cloud data 421 may indicate the shape of a 3D object (e.g., an actual 3D object or a 3D object model).

In some examples, the orientation selection instructions 423 are code to cause the processor to select an orientation of a set of initial orientations. In some examples, this may be accomplished as described in relation to FIG. 1, FIG. 2, and/or FIG. 3. For instance, the orientation selection instructions 423 may be executed to select a sequence of orientations from the set of initial orientations. For example, a first orientation may be selected. In a case that an alignment does not satisfy a fitness criterion, the orientation selection instructions 423 may be executed to iteratively select a next orientation until an alignment satisfies the fitness criterion or until all of the orientations in the set of initial orientations have been used as described herein.

In some examples, the feature determination instructions 426 are code to cause a processor to determine first features of a model point cloud and second features of a scanned point cloud using edge convolution layers of a machine learning model. In some examples, this may be accomplished as described in relation to FIG. 1, FIG. 2, and/or FIG. 3. In some examples, the first features and second features may be received from another device.

In some examples, the correspondence score computation instructions 422 are code to cause a processor to compute correspondence scores between the first features of a model point cloud and the second features of a scanned point cloud based on the orientation using an attention layer of a machine learning model. In some examples, this may be accomplished as described in relation to FIG. 1, FIG. 2, and/or FIG. 3. In some examples, the attention layer of the machine learning model includes scaled dot product attention functions.

In some examples, the alignment determination instructions 424 are code to cause the processor to determine an alignment (e.g., global alignment) of the model point cloud and the scanned point cloud based on the correspondence scores. In some examples, this may be accomplished as described in relation to FIG. 1, FIG. 2, and/or FIG. 3. In some examples, the processor may determine whether the alignment satisfies a fitness criterion. In a case that the alignment does not satisfy the fitness criterion, a next orientation may be selected, next features may be determined based on the next orientation, next correspondence scores may be determined based on the next features, and a next alignment may be determined.

In some examples, the refinement instructions 425 are instructions to cause a processor to refine the alignment (e.g., refine the global alignment). In some examples, this may be accomplished as described in relation to FIG. 1, FIG. 2, and/or FIG. 3.

In some examples, the comparison instructions 419 are code to cause the processor to compare a scanned point cloud with the model point cloud based on the alignment or the refined alignment. In some examples, this may be accomplished as described in relation to FIG. 1, FIG. 2, and/or FIG. 3.

Figure 5B:
FIG. 5B is a diagram illustrating an example of a scanned point cloud.
Figure 5A:
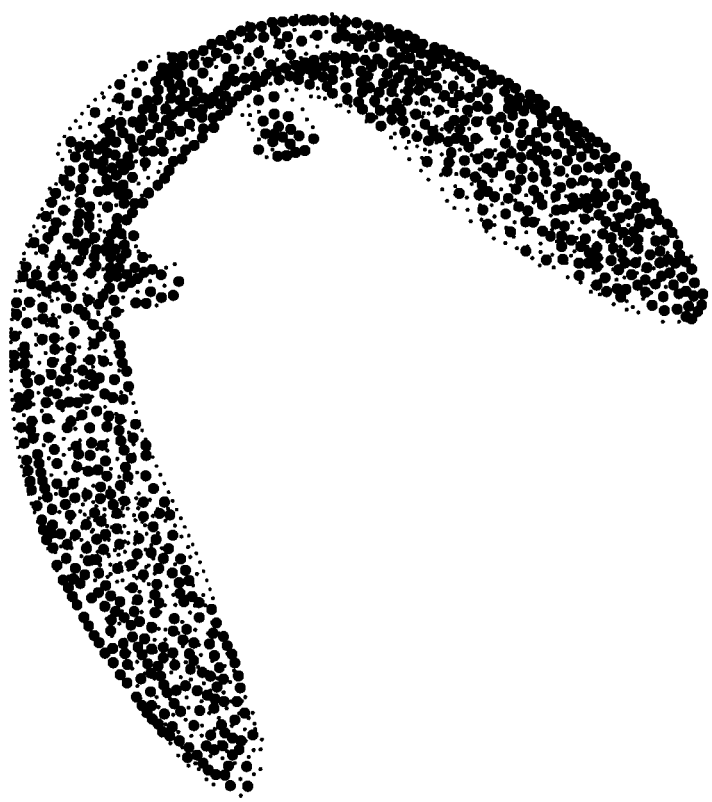
FIG. 5A is a diagram illustrating an example of a model point cloud.

FIG. 5A is a diagram illustrating an example of a model point cloud. For instance, a point cloud of a 3D object model may be utilized as a model point cloud in accordance with some of the techniques described herein. In some examples of 3D printing, the 3D object model (e.g., CAD design) may provide data and/or instructions for the object(s) to print. In some examples, an apparatus may slice layers from the 3D object model. The layers may provide the data and/or instructions for actual printing. To enable printing with improved accuracy, the 3D object model may be controlled. The model point cloud(s) may provide the representation of the 3D object model.

FIG. 5B is a diagram illustrating an example of a scanned point cloud. For instance, the scanned point cloud of FIG. 5B may be a representation of an object scan. To measure and represent the shape (e.g., geometry) of manufactured objects, a 3D scanner may be utilized to measure the geometry of the actual printed objects. The measured shape may be represented as a scanned point cloud. The scanned point cloud may be aligned with the model point cloud, which may enable calculating a deformation. For example, with two datasets: (1) scanned point clouds and (2) model point clouds, a machine learning model or models may be developed to align scanned point clouds and model point clouds, which may be utilized to calculate a deformation. The deformation may be utilized to compensate for the deformation, which may improve printing accuracy. The number and/or density of the point clouds utilized may be tunable (e.g., experimentally tunable).

Some examples of the techniques described herein may provide data-driven end-to-end approaches that find alignment between two 3D shapes. Some examples of the techniques described herein may provide deep learning approaches that may learn local geometrical structures from unstructured point clouds and/or may learn both local and global features that correspond between two geometric objects. In some examples, a deep neural network may be utilized to achieve improved alignment due to the deep neural network's data-driven nature. In some examples, a deep neural network may reduce computation costs by achieving alignment accuracy with relatively small point clouds (e.g., 1024 points) and a GPU architecture. In some examples, a neural network may utilize 3D point clouds, which may be generated from other geometric representations, to provide a flexible and scalable alignment between two different geometric representations of an object. Some examples of the techniques described herein may provide improved efficiency and/or speed relative to some random sample consensus (RANSAC) and/or ICP approaches.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be implemented within the scope of the disclosure. For example, operations, aspects, and/or elements of the examples described herein may be omitted or combined.

The invention claimed is:

1. A computer-implemented method for flexible and scalable 3D point cloud alignment, the computer-implemented method comprising:
orienting a model point cloud or a scanned point cloud based on a set of initial orientations, wherein each initial orientation in the set of initial orientations is a starting orientation of the model point cloud or the scanned point cloud from which a feature determination, a correspondence score determination, and/or alignment procedures are performed;
determining, using a first portion of a machine learning model, first features of the model point cloud based on first edges from the model point cloud, and determining second features based on second edges from the scanned point cloud;
determining, using a second portion of the machine learning model comprising attention layers including attention functions, correspondence scores between the first features and the second features based on the set of initial orientations, wherein the attention functions are used to compute relevance scores between the first features and the second features to identify spatial correspondences;
globally aligning the model point cloud and the scanned point cloud based on the correspondence scores;
determining whether a first global alignment associated with a first initial orientation satisfies a fitness criterion;
based on determining that the first global alignment does not satisfy the fitness criterion, determining a second global alignment associated with a second initial orientation; and
printing a 3D object based on the second global alignment.

2. The computer-implemented method of claim 1, wherein the second portion of the machine learning model comprises attention layers.

3. The computer-implemented method of claim 1, further comprising: based on determining that the fitness criterion is not satisfied by each global alignment associated with each initial orientation of the set of initial orientations, selecting a global alignment with a greatest fitness score.

4. The computer-implemented method of claim 1, wherein determining the first features and the second features comprises determining a combination of a corresponding local value and a corresponding global value for each of the first edges and the second edges.

5. The computer-implemented method of claim 1, wherein the first portion of the machine learning model comprises edge convolution layers.

6. The computer-implemented method of claim 1, further comprising refining a global alignment.

7. The computer-implemented method of claim 1, wherein the set of initial orientations is limited to orientations that are less than or not more than 180 degrees.

8. An apparatus, comprising:
a memory storing instructions;
a processor in electronic communication with the memory, wherein the processor is configured to execute the instructions to:
orient a model point cloud and a scanned point cloud based on a set of initial orientations, wherein each initial orientation in the set of initial orientations is a starting orientation of the model point cloud or the scanned point cloud from which a feature determination, a correspondence score determination, and/or alignment procedures are performed;
determine, for a first orientation of a set of initial orientations, a first feature for each point of a model point cloud and a second feature of a scanned point cloud using edge convolution layers of a machine learning model;
determine, for the first orientation of the set of initial orientations, point correspondence scores for point pairs between the model point cloud and the scanned point cloud using attention layers of the machine learning model;
register the model point cloud and the scanned point cloud based on the point correspondence scores for the first orientation;
determine whether a fitness criterion is satisfied for the first orientation,
wherein in response to determining that the fitness criterion is not satisfied, the processor is further configured to:
determine for a next orientation in the set of initial orientations, a next first feature for each point of the model point cloud and a next second feature for each point of the scanned point cloud using the edge convolution layers of the machine learning model;

determine, for the next orientation, next point correspondence scores for next point pairs between the model point cloud and the scanned point cloud using the attention layers of the machine learning model; and cause printing of a 3D object based on the model point cloud and/or the scanned point cloud.

9. The apparatus of claim 8, wherein, in response to determining that the fitness criterion is not satisfied, the processor is further configured to:

determine whether the fitness criterion is satisfied for the next orientation.

10. The apparatus of claim 8, wherein the processor is to refine a registration for the first orientation in response to determining that the fitness criterion is satisfied for the first orientation.

* * * * *